US006434125B1

United States Patent
Marks et al.

(10) Patent No.: US 6,434,125 B1
(45) Date of Patent: Aug. 13, 2002

(54) AUTOMATIC DATA SERVICE SELECTION METHOD AND APPARATUS FOR DIGITAL WIRELESS COMMUNICATION NETWORKS

(75) Inventors: Robert Jerrold Marks, Homewood; Thomas Trayer Towle, Naperville, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/957,634

(22) Filed: Oct. 24, 1997

(51) Int. Cl.[7] .................................................. H04Q 7/00
(52) U.S. Cl. ........................ 370/328; 370/342; 370/347; 455/557; 358/434
(58) Field of Search ................................. 370/328, 329, 370/335, 336, 343, 342, 345, 441, 442, 347, 525, 527, 526, 352; 455/422, 466, 557; 358/434, 442

(56) References Cited

U.S. PATENT DOCUMENTS

| 5,487,175 A | * | 1/1996 | Bayley et al. | ............... 455/422 |
| 5,488,653 A | * | 1/1996 | Dimolitsas et al. | .... 379/100.17 |
| 5,574,773 A | * | 11/1996 | Grob et al. | ................. 455/466 |
| 5,590,406 A | * | 12/1996 | Bayley et al. | ............... 455/466 |
| 5,752,199 A | * | 5/1998 | Scott | ........................... 455/557 |
| 5,864,763 A | * | 1/1999 | Leung et al. | ............... 455/557 |
| 6,038,037 A | * | 3/2000 | Leung et al. | ................ 358/438 |
| 6,049,535 A | * | 4/2000 | Ozluturk | ...................... 370/335 |
| 4,775,995 A | * | 6/2000 | Chapman et al. | ........... 455/550 |
| 5,479,475 A | * | 6/2000 | Grob et al. | .................. 455/557 |
| 6,075,792 A | * | 6/2000 | Ozluturk | ...................... 370/441 |

FOREIGN PATENT DOCUMENTS

| EP | 0480083 A1 | 4/1992 |
| WO | WO 96/32817 | 10/1996 |
| WO | WO 98/00998 | 1/1998 |

* cited by examiner

Primary Examiner—David Vincent
Assistant Examiner—Bob A. Phunkulh
(74) Attorney, Agent, or Firm—Grossman, Patti & Brill

(57) ABSTRACT

In a digital cellular communications network, calls to and from a fax machine or other data equipment coupled to a digital phone require special encoding circuitry. Calls to and from a fax machine or other data device using amplitude and/or phase modulated tones can be handled more efficiently by monitoring such incoming calls for the presence of audio control tones. Upon the detection of such tones, appropriate encoding circuitry is automatically switched in to properly encode/decode data tones so as to permit the automatic transmission of data over a wireless cellular network using CDMA, TDMA or other digital protocols.

40 Claims, 4 Drawing Sheets

10

AUTOMATIC DATA SERVICE SELECTION METHOD AND APPARATUS FOR DIGITAL WIRELESS COMMUNICATION NETWORKS

BACKGROUND OF THE INVENTION

This invention relates to communication networks. In particular, this invention relates to digital wireless communication networks also known as digital cellular networks.

Digital cellular communication networks are well known. Instead of using an analog signal to modulate a radio frequency carrier, digitized and encoded information is modulated onto a radio frequency wave that is received, and information is recovered by decoding and converting the digital information back to an analog format.

Most digital cellular networks use so-called CDMA, TDMA or other encoding techniques to carry digital information between subscribers.

FIG. 1 shows a simplified block diagram of a prior art digital cellular communication system (10). A cellular service provider (12) provides wireless cellular communications service to subscribers that includes the ability to communicate between a portable or mobile cellular telephone subscriber unit (14) and other telephone users (16). A telephone call to a cellular subscriber (14) from a land-line telephone 16 is first routed through the public switched telephone network (PSTN) (18). By analyzing the called number, the PSTN (18) routes the call to equipment owned and operated by the cellular service provider (12) by analysis of the called number.

When an incoming call (20) to the cellular subscriber (14) is received at the switching equipment (22) of the cellular service provider (12), encoding circuitry (23) of the cellular service provider converts analog voice signals to a digital format. The encoded information is transmitted (24) across the cellular service provider's network, being received by the cellular telephone (26) that is being called by the caller.

The called subscriber's cellular telephone (26) includes within it circuitry to demodulate the radio frequency signal, decode the digital information therein, and reconstruct the original analog waveform of the caller's voice so that a conversation can take place. The caller's voice is reproduced whereby the path between the caller (16) and the called party (14) appears to be seamless.

A problem with prior art wireless cellular networks, however, is their inability to accommodate data transmission without first using a special dialing procedure to access special encoding circuitry. Facsimile machines (28, 32), which are commonly used to transmit documents, use audio frequency tones to transmit digitized images. The audio frequency tones used by facsimile machines (28, 32) are phase and amplitude modulated and the encoding circuitry (23) used to digitize voice information cannot properly encode tones from a fax machine. Similarly, tones used by modems to exchange data between computers are both phase and amplitude modulated.

To FAX a document over a digital wireless communications network, a caller with a fax to send to someone using a digital cellular phone network must dial a separate number of the cellular service provider that is equipped to accept calls from facsimile machines. After a call is placed to such a number, the phone number of the cellular service customer to whom the fax is addressed must then be entered in order to route the call to the proper phone. This two-step dialing procedure is cumbersome and requires the intervention of the caller.

Another method of providing fax capability to digital wireless subscribers is to allocate a separate number for the subscriber (26) to which is coupled encoding circuitry (30) for data transmissions. A drawback of this approach, however, is that for every subscriber, the cellular service provider must allocate two numbers: one number for voice frequency telephone calls and another number for facsimile transmissions.

A problem with these prior art digital cellular networks is their inability to automatically accommodate data transmissions, such as those from a fax machine but also including those that originate from a computer. Since voice signals are encoded using one technique and data signals are encoded using a different technique, a method and apparatus for automatically routing data calls to appropriate equipment needed to encode data would be an improvement over the prior art. Callers to a subscriber of wireless digital cellular service who wish to send data, i.e., either a fax or computer data, might be able to call one number that belongs to the cellular subscriber and have either a voice frequency exchange with the subscriber or send a fax or other data to the subscriber without having to dial a separate number. A cellular service provider could accommodate customers' data transmissions automatically, without having to allocate separate numbers for data transmission.

An object of the present invention is to provide an automatic service selection technique for use with digital wireless networks whereby voice frequency signals and data signals can be automatically switched to appropriate encoding circuitry prior to transmission on the digital wireless network.

SUMMARY OF THE INVENTION

There is provided herein a method and an apparatus to automatically identify a call from a fax machine and upon the detection thereof to route the call to appropriate conversion circuitry for encoding facsimile machine data for transmission on a digital wireless network.

The invention is comprised of circuitry that monitors incoming or outgoing calls to or from a digital wireless subscriber for the presence of facsimile machine connect tones, the presence of which identifies the call as originating from a fax machine. If such tones are detected, the call is automatically routed to specialized circuitry capable of modulating fax machine tones. If facsimile machine control tones are not detected, audio signals for the call are routed to other circuitry used to digitize and encode voice signals.

In an alternate embodiment, computer modems equipped to produce other control tones can be recognized and used to identify the call as originating from a modem. In this case, other circuitry could be used to route computer data from a modem to other circuitry that is capable of encoding phase and amplitude modulated audio signals used with computer data.

DETAILED DESCRIPTION OF THE PREFERRED EMBODIMENT

Figure 2:
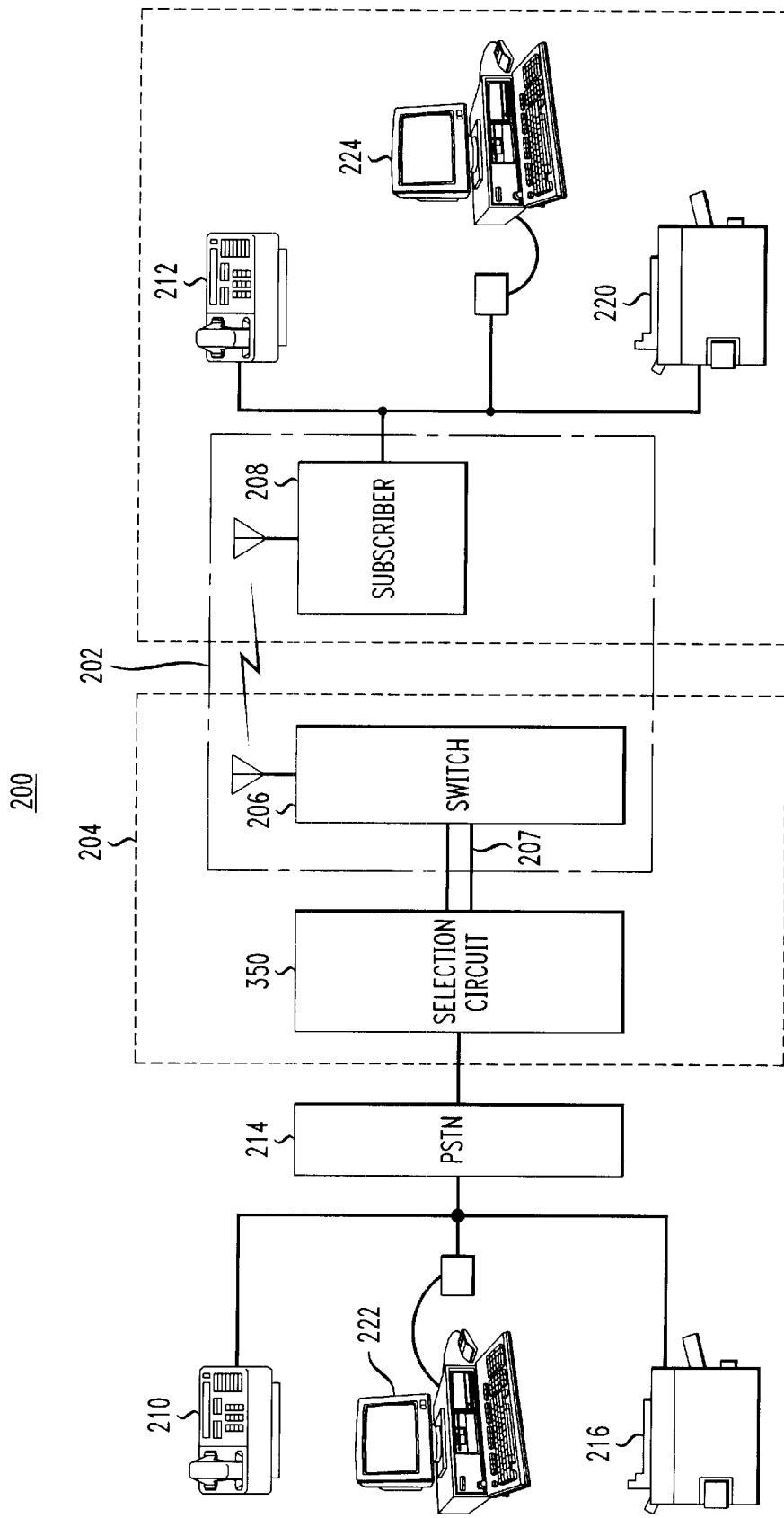
FIG. 2 shows a simplified block diagram of a digital wireless communications network and the cellular infrastructure equipment augmented by the invention described herein by which incoming calls from a fax machine can be automatically routed to appropriate circuitry.

FIG. 2 shows a simplified block diagram of a wireless digital communications system (200). A digital wireless communications network (202) is comprised of at least the cellular service provider infrastructure (204) and at least one digital wireless subscriber unit (208). In reality, there could be numerous digital wireless subscribers.

The digital wireless subscriber unit (208) might be a portable or mobile cellular telephone capable of sending and receiving digitally encoded information using so-called CDMA or TDMA encoding techniques. The digital cellular subscriber radio (208) makes and receives telephone calls by virtue of radio signals exchanged between it and the cellular service subscribers radio and switching equipment (206), using well-known prior art.

The cellular switching and radio equipment (206) includes circuitry to digitize and encode voice frequency signals such as those produced by a standard telephone (210). The cellular subscriber unit (208) will, of course, have its own telephone-like handset (212) through which a user would talk and listen. Circuitry within the subscriber unit (208) encodes and decodes analog voice frequency signals to and from the cellular switching and radio equipment (206).

A call originating from a land-line telephone (210) to the digital wireless subscriber unit (208) is accomplished by dialing the phone number corresponding to and identifying the digital wireless subscriber unit (208). The public switched telephone network (214) routes the call to the cellular service provider's infrastructure equipment (204), which includes the aforementioned switching and radio equipment (206). Switching equipment operated by the service provider (206) identifies the subscriber unit being called (208) from the dialed digits incoming to the equipment (206) and formats the appropriate signaling information to make the connection between the subscriber unit (208) and the infrastructure equipment (206) of the cellular service provider (204).

If a call being placed to the mobile or portable cellular subscriber unit (208) originates from a fax machine (216), switching equipment operated by the cellular service provider (204), will attempt to encode the information from the fax machine using the same circuitry normally used for a voice call. The fax transmission will fail, the calling party and the operator of the mobile subscriber unit (208) will not receive the document attempted to be sent thereby.

By inclusion of a circuit (350) designed to automatically detect the facsimile machine connection tones, audio signals from machine such as a fax machine or a computer modem can be routed to different encoding circuitry whereby phase and amplitude modulated audio frequency signals can be accurately encoded for transmission to the fax machine or computer modem of a digital wireless cellular telephone user without loss of any information.

In the embodiment shown in FIG. 2, an automatic data service selection circuit (350) receives all incoming calls to the cellular service provider's equipment (204) and automatically routes incoming audio signals to the appropriate conversion and modulation circuitry upon the detection of fax machine connect tones. A fax machine (220) coupled to the wireless subscriber unit radio (208) capable of reproducing the fax sent by the calling party from its machine (216) can receive the call after the subscriber's telephone reconstructs the audio tones that originated at the sending-end fax machine.

In an alternate embodiment, a data exchange between a computer (222) and a computer (224) coupled to the digital wireless subscriber unit (208) might also be accommodated through the use of the invention described herein. In such an embodiment, control tones of a fax machine and control tones of a modem could be tested simultaneously by the automatic data service selection service circuit (350) and upon the detection of either control tone or set of control tones, appropriate conversion circuitry might be employed to properly encode information for the digital wireless network (202).

Figure 3:
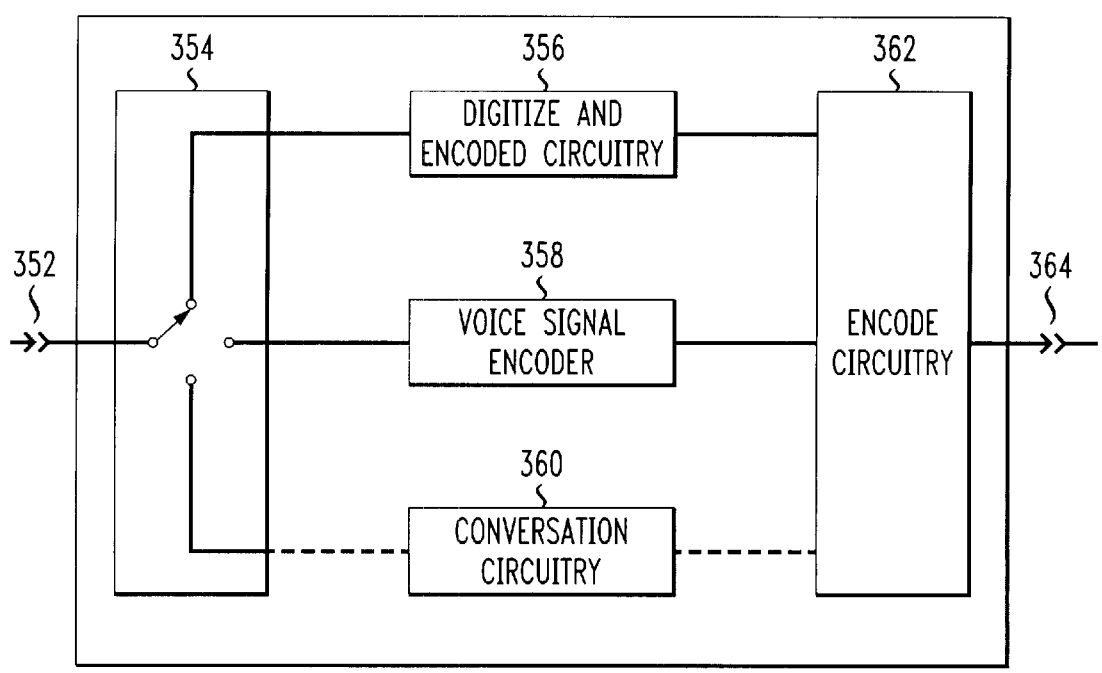
FIG. 3 shows a block diagram for the functional elements of the invention described herein.

FIG. 3 shows a functional block diagram of an automatic service selection circuit (350) shown in FIG. 2. The automatic service selection circuit (350) has an input port (352) into which audio signals from devices such as a telephone, a modem coupled to a computer, or a fax machine are coupled.

Audio control tone detection circuitry (354) includes circuitry specifically designed to detect the presence of audio control tones, the presence of which indicate the connection of a fax machine or a modem. A relay, analog switch, or other means for routing an analog signal within and part of the audio control tone detection circuitry (354) routes the audio frequency input signals to the appropriate analog to digital conversion circuitry (356,358,360) described below. The audio detection circuitry and routing electronics (354) could be accomplished using passive or active analog filters constructed to detected particular modem control tones or fax machine connect tones but could also be implemented using digital signal processor techniques by which an audio tone would be digitally tested for its amplitude and frequency.

Fax machine control tones are well-known and standardized. The connect tone of an automatic calling fax machine in the transmit mode, ready to transmit on its receipt of a digital identification signal from another fax machine is well-known to be an 1100Hz. tone that repeats an on/off sequence of 0.5 seconds "on" followed by 3 seconds "off."

If the audio control tone detection circuitry (354) detects the presence of a control tone from a fax machine, the call would be routed to digitizing and encoding circuitry (356) that is capable of digitizing and encoding the amplitude and phase shifted audio tones output from a fax machine and which represent scanned images thereon. If the audio control tones of a fax machine are not detected within some predetermined length of time, which would be a design choice, the audio control detection circuitry (354) would route the incoming audio on the input port (352) as it ordinarily does, i.e., to circuitry capable of encoding voice signals (358) for transmission on the digital cellular network. Some of the digital cellular networks currently in use so-called CDMA or TDMA format encoding. Selection of the conversion circuitry appropriate for the particular digital cellular format used in the digital cellular network would be a design choice.

In another embodiment of the invention, the audio control detection circuitry (354) could test for the presence of yet other tones that could be used to indicate an incoming call from a computer or other data device, the presence of which could be used by the audio control detection circuitry (354)

to route the audio signal to yet other conversion circuitry (360) necessary to convert the data tones to the appropriate format for transmission on the digital wireless communications network. In addition to detecting a single control tone, the audio control detection circuitry could be constructed to test for the presence of multiple control tones, each a different frequency, amplitude and/or phase, combined together. Also, sequences of one or more tones sent serially might also be used by data transmission equipment. The presence and order of serialized tones at different frequencies and/or amplitudes and phases could also be tested for and upon the detection thereof, audio signals could be routed to appropriate analog-to-digital (A/D) conversion circuitry.

Output from the encoding circuitry (356, 358 or 360) is coupled to other appropriate encoding circuitry (362) necessary to format an outgoing bit stream of the proper format necessary for transmission in the digital wireless communications network (200).

Figure 1:
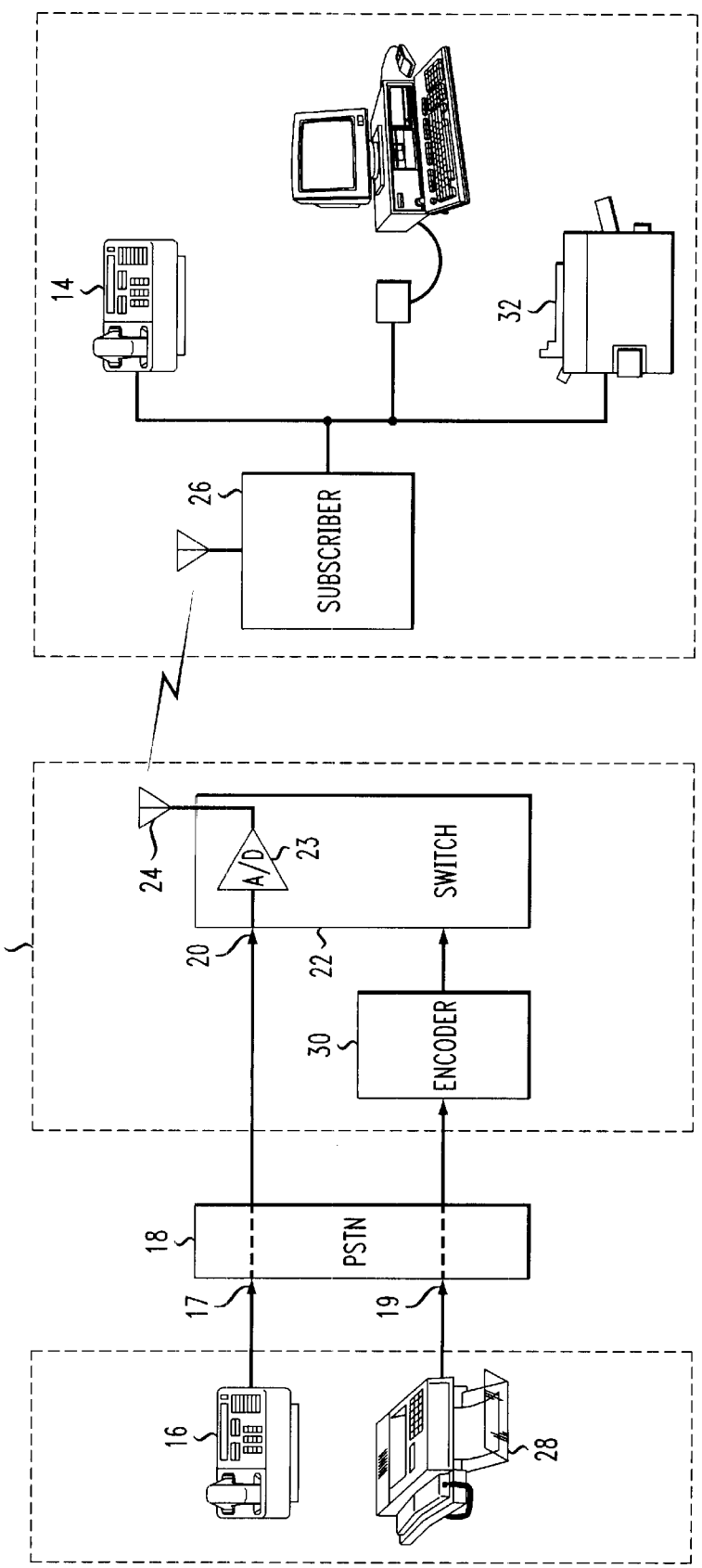
FIG. 1 shows a simplified block diagram of a prior art communication system showing a cellular service provider's use of equipment necessary to handle facsimile transmissions across a digital wireless network.

By continuously monitoring incoming signals at the input port (352), the automatic service selection circuit (350) precludes the necessity of having dedicated switching equipment for fax machines and data signals such as those represented by reference numeral (30) in FIG. 1. The automatic service selection circuit shown in FIG. 3 could be duplicated for each incoming trunk to the cellular service provider's equipment whereby an incoming call to a cellular subscriber unit (208) as shown in FIG. 2 could automatically be routed to the appropriate voice coder preventing lost calls placed by facsimile equipment.

Figure 4:
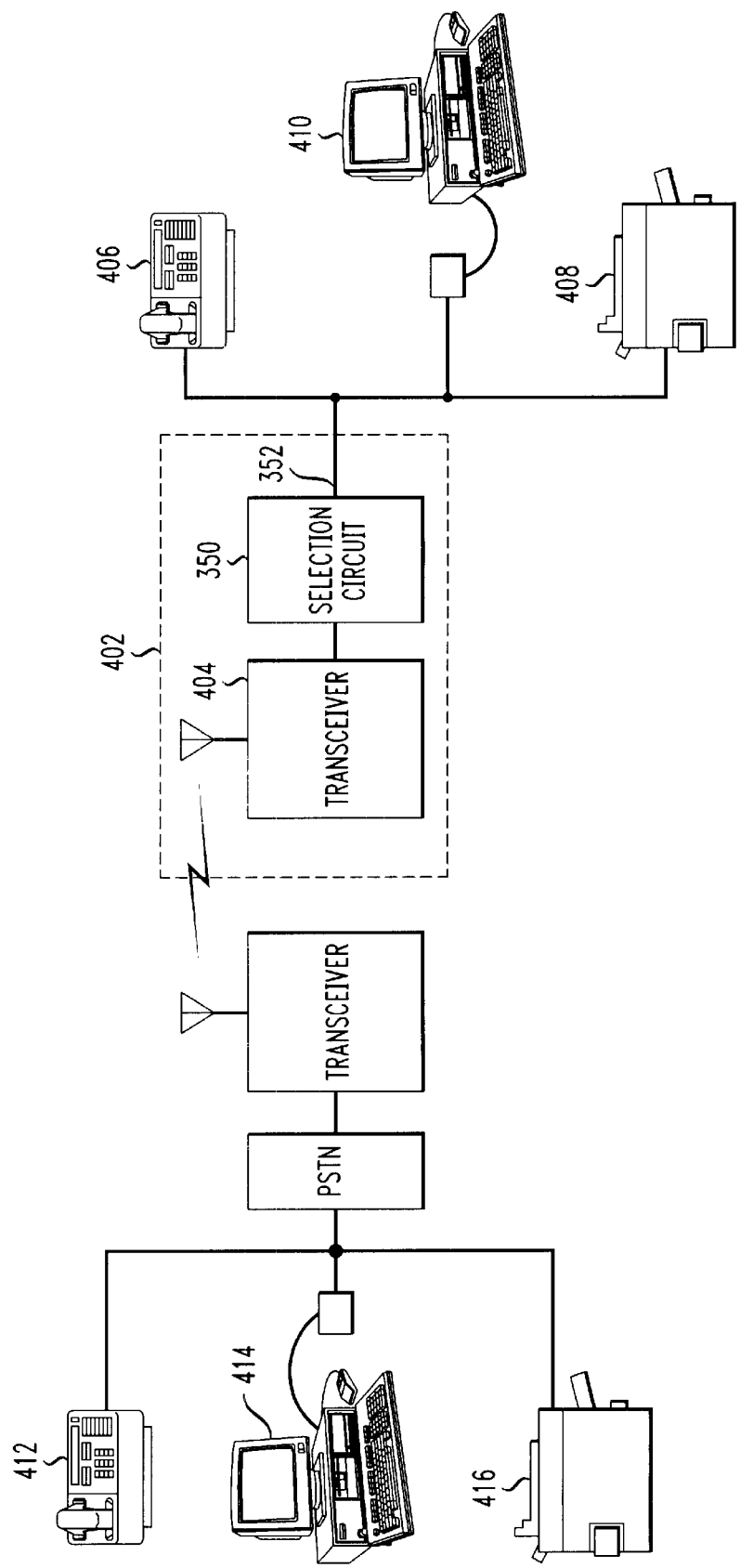
FIG. 4 shows a simplified block diagram of the invention in use at the subscriber end of a digital wireless communications network.

In instances where a consumer has only digital wireless cellular service to a residence, the subscriber would need to be able to automatically format outgoing facsimile transmissions using the above-identified device. In FIG. 4, a digital wireless communications network includes a digital wireless cellular subscriber unit (402) comprised of a cellular telephone-like transceiver (404) and the automatic service selection circuit (350) shown in FIG. 3. Calls from a telephone (406) in the subscriber's home, are coupled to the input port (352) of the automatic service selection circuit. Similarly, a fax machine (408) or a digital computer with a modem (410) could also be coupled to the input of the automatic service selection circuit. Calls placed to another telephone (412), a computer (414), or another fax machine (416) are readily accomplished by the automatic routing or the automatic encoding of audio signals from either the telephone (406), the computer (410) or the fax machine (408).

The apparatus shown in FIG. 3 provides the proper encoding for voice frequency signals based upon the detection of audio control tones emitted by either a fax machine or a modem. The subscriber experiences no call set up delay, no lost calls, and the cellular service provider reduces the number of lines or phone numbers that must be set aside to handle outgoing data transmissions such as those from a fax machine (408) or a computer (410).

What is claimed is:

1. A method of automatically coupling amplitude, phase, and frequency-modulated audio signals representing data and audio-frequency voice signals from an analog communications network to a digital communications network, for transmission on said digital communications network, the method comprising the steps of:

a) receiving, from said analog communications network, an analog audio frequency signal for conversion to a digital signal for transmission on said digital communications network;

b) testing said analog audio frequency signal for the presence of a first predetermined signal, wherein the first predetermined signal is a connect tone of a facsimile machine;

c) routing said analog frequency signal to a first analog to digital signal converter that converts said analog frequency signal to a first digital signal when said first predetermined signal is present; and d) transmitting said digital signals on said digital communications network to a terminating wireless communication device.

2. The method of claim 1 wherein said step of testing said analog audio frequency signal for the presence of a first predetermined signal further includes the step of testing said analog frequency signal for the presence of a first predetermined audio frequency signal.

3. The method of claim 1 wherein said step of testing said analog audio frequency signal for the presence of a first predetermined signal further includes the step of testing said analog frequency signal for the presence of an 1100 Hz tone.

4. The method of claim 1 wherein said step of testing said analog audio frequency signal for the presence of a first predetermined signal further includes the step of testing said analog frequency signal for the presence of a plurality of audio frequency signals.

5. The method of claim 1 wherein said step of testing said analog audio frequency signal for the presence of a first predetermined signal further includes the step of testing said analog frequency signal for the presence of a series of audio frequency signals.

6. The method of claim 1 where said step of converting said analog audio frequency signal to digital signals using said first analog to digital conversion process to form a first digital signal stream, prior to transmission on said digital communications network, if said first predetermined signal is not present; is further comprised of the steps of:

converting said analog audio frequency signal to digital signals for transmission using a conversion process for converting voice-frequency signals to CDMA-format cellular telephone signals.

7. The method of claim 1 where said step of converting said analog audio frequency signal to digital signals using said first analog to digital conversion process to form a first digital signal stream, prior to transmission on said digital communications network, if said first predetermined signal is not present; is further comprised of the steps of:

converting said analog audio frequency signal to digital signals for transmission using a conversion process for converting voice-frequency signals to TDMA-format cellular telephone signals.

8. The method of claim 1 where said converting said analog audio frequency signal to digital signals using said first analog to digital conversion process, prior to transmission on said digital communications network, if said first predetermined signal is present in said analog audio frequency signal is further comprised of the steps of:

converting said analog audio frequency signal to digital, signals for transmission using a conversion process for converting audio frequency data signals to CDMA-format cellular telephone signals.

9. The method of claim 1 where said converting said analog audio frequency signal to digital signals using said first analog to digital conversion process, prior to transmission on said digital communications network, if said first predetermined signal is present in said analog audio frequency signal is further comprised of the steps of:

converting said analog audio frequency signal to digital, signals for transmission using a conversion process for converting audio frequency data signals to TDMA-format cellular telephone signals.

10. A method of automatically coupling amplitude, phase, and frequency-modulated audio signals representing data, and audio-frequency voice signals from an analog communications network to a digital communications network, for transmission on said digital communications network, said digital communications network converting analog voice signals to digital signals for transmission on said digital communications network using a first analog to digital conversion process and converting amplitude, phase, and frequency-modulated audio signals to digital signals for transmission on said digital communications network using at least a second analog to digital conversion process comprised of the steps of:

a) receiving from said analog communications network, an analog audio frequency signal for conversion to a digital signal for transmission on said digital communications network;

b) testing said analog audio frequency signal for the presence of a first predetermined signal, wherein the first predetermined signal is a connect tone of a facsimile machine;

c) routing said analog frequency signal to a first analog to digital signal converter that converts said analog frequency signals to a first digital signal, if said first predetermined signal is present;

d) routing said analog frequency signal to a second analog to digital signal converter that converts said analog frequency signals to a second digital signal if said first predetermined signal is not present; and e) transmitting said digital signals on said digital communications network to a terminating wireless communication device.

11. The method of claim 10 wherein said step of testing said analog audio frequency signal for the presence of a first predetermined signal further includes the step of testing said analog audio frequency signal for the presence of a first predetermined audio frequency signal.

12. The method of claim 10 wherein said step of testing said analog audio frequency signal for the presence of a first predetermined signal further includes the step of testing said analog audio frequency signal for the presence of an 1100 Hz tone.

13. The method of claim 10 wherein said step of testing said analog audio frequency signal for the presence of a first predetermined signal further includes the step of testing said analog audio frequency signal for the presence of a plurality of audio frequency signals.

14. The method of claim 10 wherein said step of testing said analog audio frequency signal for the presence of a first predetermined signal further includes the step of testing said analog audio frequency signal for the presence of a series of audio frequency signals.

15. The method of claim 10 where said step of converting said analog audio frequency signal to digital signals using said first analog to digital conversion process to form a first digital signal stream, prior to transmission on said digital communications network, if said first predetermined signal is not present; is further comprised of the steps of:

converting said analog audio frequency signal to digital signals for transmission using a conversion process for converting voice-frequency signals to CDMA-format cellular telephone signals.

16. The method of claim 10 where said step of converting said analog audio frequency signal to digital signals using said first analog to digital conversion process to form a first digital signal stream, prior to transmission on said digital communications network, if said first predetermined signal is not present; is further comprised of the steps of:

converting said analog audio frequency signal to digital signals for transmission using a conversion process for converting voice-frequency signals to TDMA-format cellular telephone signals.

17. The method of claim 10 where said converting said analog audio frequency signal to digital signals using said first analog to digital conversion process, prior to transmission on said digital communications network, if said first predetermined signal is present in said analog audio frequency signal is further comprised of the steps of:

converting said analog audio frequency signal to digital, signals for transmission using a conversion process for converting audio frequency data signals to CDMA-format cellular telephone signals.

18. The method of claim 10 where said converting said analog audio frequency signal to digital signals using said first analog to digital conversion process, prior to transmission on said digital communications network, if said first predetermined signal is present in said analog audio frequency signal is further comprised of the steps of:

converting said analog audio frequency signal to digital, signals for transmission using a conversion process for converting audio frequency data signals to TDMA-format cellular telephone signals.

19. An apparatus for selectively coupling amplitude, phase, and frequency-modulated audio signals representing data, and audio-frequency voice signals from an analog communications network to a digital communications network, for transmission on said digital communications network, said digital communications network converting analog voice signals to digital signals for transmission on said digital communications network using a first analog to digital conversion process and converting amplitude, phase, and frequency-modulated audio signals to digital signals for transmission of said digital communications network using at least a second analog to digital conversion process, the apparatus comprising:

a) signal receiving means for receiving from said analog communications network an analog audio frequency signal to be converted to a digital signal for transmission on said digital communications network;

b) testing means, coupled to said signal receiving means, for testing said analog audio frequency signal for the presence of a first predetermined signal, wherein the first predetermined signal is a connect tone of a facsimile machine;

c) first converter means, coupled to said testing means and to said signal receiving means, for converting said analog audio frequency signal to digital signals using said first analog to digital conversion process to form a first digital signal stream, prior to transmission on said digital communications network when said first predetermined signal is not present;

d) second converter means, coupled to said testing means and to said signal receiving means, for converting said analog audio frequency signal to digital signals using said second analog to digital conversion process to form a second digital signal stream, prior to transmission on said digital communications network when said first predetermined signal is present; and e) a transmitting for transmitting said first and second digital signal streams onto said digital communications network to a terminating communication device.

20. The apparatus of claim 19 wherein said testing means further includes:
   signal routing means for routing said analog frequency signal to a first analog to digital signal converter device if said first predetermined signal is not present; and
   for routing said analog frequency signal to a second analog to digital signal converter if said first predetermined signal is present.

21. The apparatus of claim 19 wherein said testing means includes means for testing said analog frequency signal for the presence of facsimile machine connection tones.

22. The apparatus of claim 19 wherein testing means further includes means for testing said analog frequency signal for the presence of a first predetermined audio frequency signal.

23. The method of claim 19 wherein said testing means further includes means for testing said analog audio frequency signal for the presence of 1100 Hz tones.

24. The apparatus of claim 19 wherein said testing means further includes means for testing said analog frequency signal for the presence of a plurality of audio frequency signals.

25. The apparatus of claim 19 wherein said means for testing said analog audio frequency signal for the presence of a first predetermined signal further includes: means for testing said analog frequency signal for the presence of a series of audio frequency signals.

26. The apparatus of claim 19 where said first converting means is further comprised of means for converting said analog audio frequency signal to digital signals for transmission using a conversion process for converting voice-frequency signals to CDMA-format cellular telephone signals.

27. The apparatus of claim 19 where said second converter means is further comprised of: means for converting said analog audio frequency signal to digital signals for transmission using a conversion process for converting voice-frequency signals to CDMA-format cellular telephone signals.

28. The apparatus of claim 19 where said first converter means is further comprised of: means for converting said analog audio frequency signal to digital signals for transmission using a conversion process for converting audio frequency data signals to TDMA-format cellular telephone signals.

29. The apparatus of claim 19 where said second converting means is further comprised of means for converting said analog audio frequency signal to digital, signals for transmission using a conversion process for converting audio frequency data signals to TDMA-format cellular telephone signals.

30. The apparatus of claim 19 wherein said digital communications network is a digital wireless communications network.

31. The apparatus of claim 19 wherein said signal receiving means is an audio amplifier stage.

32. The apparatus of claim 19 wherein said signal receiving means is a digital signal processor.

33. The apparatus of claim 19 wherein said testing means is an analog audio filter.

34. The apparatus of claim 19 wherein said testing means is a digital signal processor.

35. The apparatus of claim 19 wherein said first converter means includes an analog to digital converter circuit.

36. The apparatus of claim 19 wherein said first converter means includes a digital signal processor.

37. The apparatus of claim 19 wherein said second converter means includes an analog to digital converter circuit.

38. The apparatus of claim 19 where said second converter means includes a digital signal processor.

39. The apparatus of claim 19 wherein said transmitting means includes a cellular telephone.

40. The apparatus of claim 19 wherein said transmitting means includes a cellular telephone base station.

* * * * *